United States Patent [19]

Blaylock et al.

[11] 4,114,789
[45] Sep. 19, 1978

[54] MOUNTING APPARATUS FOR VEHICLE EMERGENCY WARNING SIGNAL

[75] Inventors: Arnold O. Blaylock; Robert P. Falconer; Charles M. Campbell, all of Fort Worth, Tex.

[73] Assignee: Lectric Lites Company, Fort Worth, Tex.

[21] Appl. No.: 787,552

[22] Filed: Apr. 14, 1977

[51] Int. Cl.² .............................................. B60N 11/00
[52] U.S. Cl. ................................................. 224/42.1 E
[58] Field of Search ...................... 224/42.1 R, 42.1 A, 224/42.1 B, 42.1 E, 42.1 F, 42.1 G, 42.1 H, 29 R; 240/57, 72; 340/87, 50; 296/37.7; 248/237, 352, 503

[56] References Cited

U.S. PATENT DOCUMENTS

| 2,714,480 | 8/1955 | Harris | 224/42.1 E |
| 2,840,290 | 6/1958 | Roberts | 224/42.1 R |
| 3,104,042 | 9/1963 | Gaus | 224/42.1 E |
| 3,465,929 | 9/1969 | Chorey | 224/42.1 E |
| 3,858,774 | 1/1975 | Friis | 224/42.1 F |

FOREIGN PATENT DOCUMENTS

| 1,282,675 | 11/1962 | France | 224/42.1 A |
| 216,092 | 11/1941 | Switzerland | 224/42.1 E |

Primary Examiner—Trygve M. Blix
Assistant Examiner—Jesus D. Sotelo
Attorney, Agent, or Firm—Wofford, Felsman, Fails & Zobal

[57] ABSTRACT

A mounting apparatus for attaching a warning signal device to the roof of a vehicle. The warning signal apparatus has a rectangular frame with a metal rim. Signal lights enclosed within a light transmitting housing are located on each side. The frame is connected to the roof by four mounting assemblies, one attached to the rim of the frame of each corner. The mounting assembly includes a bracket to which a resilient pad is pivotally attached. A clip has a portion that engages the roof and is connected to the bracket by an adjusting screw to pull the frame tightly to the roof.

3 Claims, 3 Drawing Figures

U.S. Patent  Sept. 19, 1978  4,114,789
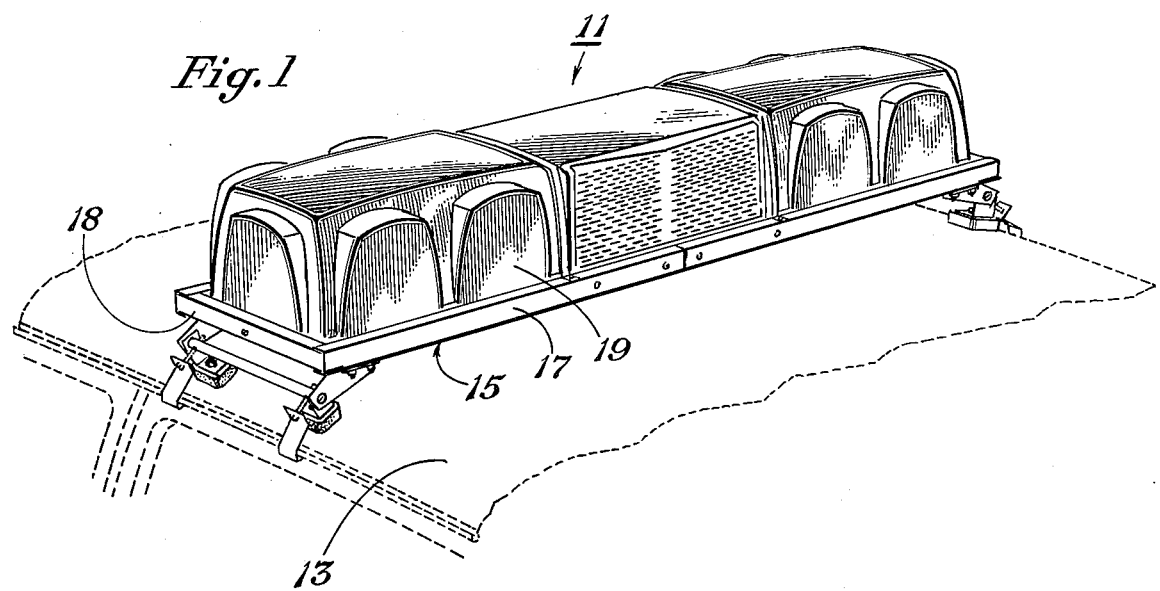
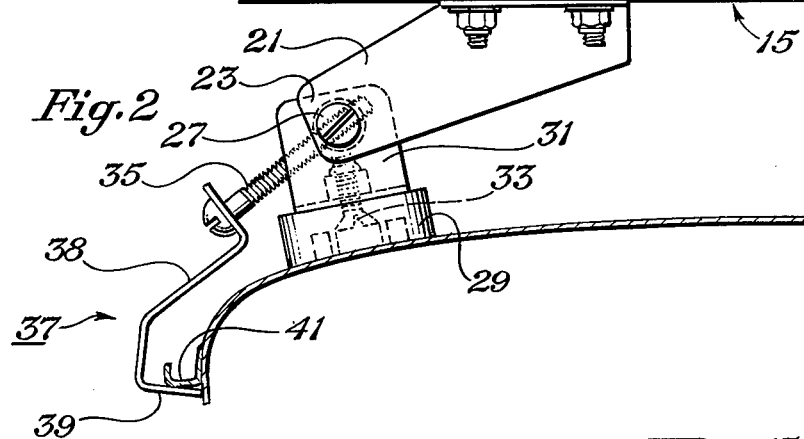
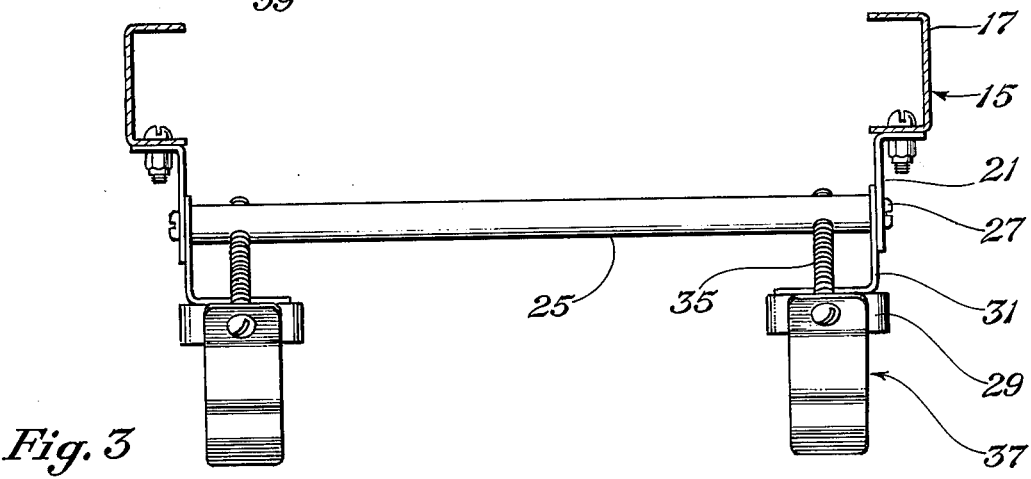

MOUNTING APPARATUS FOR VEHICLE EMERGENCY WARNING SIGNAL

BACKGROUND OF THE INVENTION

1. Field of the Invention

This invention relates in general to vehicle warning light signals, and in particular to a mounting apparatus for attaching a warning light to the roof of a vehicle.

2. Description of the Prior Art

Commonly used warning signal light devices for emergency vehicles have rectangular frames that extend transversely across the roof of a vehicle. Flashing or rotating lights are located on each side of the frame and are enclosed by a light transmitting housing.

Various devices are used to mount the warning signal apparatus to the vehicle roof, one of which is shown in U.S. Pat. No. 3,404,371. While serving the purpose, many of the known mounting devices are difficult to adapt from one vehicle to the other, and do not provide sufficient stability at high speeds. It is desirable for a mounting device to rigidly retain the warning signal apparatus to the vehicle and prevent forward and rearward movement at high speeds due to the force of the wind. Since police cars are replaced at fairly frequent intervals, the mounting apparatus should allow for quick installation and removal of the warning signal apparatus on roofs of various shapes and sizes.

SUMMARY OF THE INVENTION

It is accordingly a general object of this invention to provide an improved mounting apparatus for emergency vehicle warning signal.

It is a further object to provide an improved mounting apparatus for an emergency vehicle warning signal that prevents forward and rearward motion of the signal at high speeds.

It is a futher object to provide an improved mounting apparatus for an emergency vehicle warning signal that allows quick removal and installtion on various vehicle roof sizes and shapes.

In accordance with these objects, a mounting apparatus is provided that uses four mounting assemblies, one at each corner. At each location, a bracket is directly connected to the rim of the frame for stability. A pad is connected to the bracket and is pivotal so that it may be adjusted to contact the sloping portion of the vehicle roof. A clip is adjustably linked to the bracket and engages the roof to retain the warning signal apparatus on the roof.

BRIEF DESCRIPTION OF THE DRAWINGS

FIG. 1 is a perspective view of a warning signal mounted in accordance with this invention on the roof of a vehicle, shown partially in phantom.

FIG. 2 is a partial front elevational view of the mounting apparatus of the warning signal of FIG. 1.

FIG. 3 is a side elevational view of the mounting apparatus of the warning signal of FIG. 1.

DESCRIPTION OF THE PREFERRED EMBODIMENT

A warning signal apparatus 11 is shown attached to the roof 13 of a vehicle, shown in phantom. The warning signal apparatus 11 has a rectangular platform or frame 15 that extends sbstantially across the roof transverse to the direction of travel. A metal rim, including longitudinal members 17 and lateral members 18, extends around the frame 15 to retain the light transmitting housings 19 located on each side of the warning signal apparatus 11. Signal light means comprising flashing or rotating lights (not shown) are attached to frame 15 and enclosed by housings 19.

The mounting means for mounting the warning signal apparatus 11 to the vehicle roof 13 includes a bracket 21 bolted to each longitudinal member 17 of the metal rim adjacent each corner. A plurality of holes (not shown) in longitudinal member 17 allow the bracket 21 to be coupled at various points along the member 17 for different roof sizes. Bracket 21 has an outer end portion 23 extending downwardly and outwardly between the vehicle roof 13 and frame 15. A rod 25 is coupled between the outer end portion 23 of the brackets 21 on each side parallel with lateral members 18 of the rim. Rod 25 is coupled to the outer ends 23 by a screw 27 extending through an aperture in each outer end, allowing the rod to be rotated with respect to bracket 21 when loosened.

A resilient pad 29 has an upstanding flange 31 connected to its upper surface by screw 33. Flange 31 has an aperture on its upper portion for receiving screw 27 to pivotally couple it to bracket 21. The aperture in flange 31 is smaller than the diameter of rod 25, interposing it between the end of rod 25 and bracket 21.

A pair of screws 35 are threaded into rod 25 near the ends and extend outwardly parallel with the longitudinal members 17 of the rim. Screw 35 passes through an aperture in a clip 37, which is retained by the head of the screw 35. An intermediate portion 38 of clip 37 is bent to extend outwardly substantially parallel with screw 35. The lower end 39 of each clip 37 is bent inwardly so as to fit under the rain gutter 41 or edge of the vehicle roof 13, if the vehicle does not have a rain gutter. The lower end 39 is bent so as to be substantially parallel with the edge of vehicle roof 13. This places it slightly at an angle with respect to the rain gutter 41, as shown in FIG. 2. The lower end 39 serves as catch means for engaging the edge of the roof.

In operation, brackets 21 are attached to the longitudinal members 17 of the metal rim. The distance from the corner for each bracket is selected so as to place each pad 29 on the sloping edge of the vehicle roof 13. Screws 27 are loosened to allow pads 29 to be pivoted until their lower surfaces are substantially parallel with the vehicle roof 13. Rod 25 is rotated to align clips 37 so that their lower ends 39 engage the rain gutter 41. Screws 27 are tightened to lock the rod 25 and pads 29 in the desired orientation. Screws 35 are tightened to draw the frame 15 tightly against the roof, thus serving as means for changing the distance between the clips and the brackets.

It should be apparent that an invention having significant improvements has been provided. The mounting apparatus rigidly ties the warning signal to the vehicle roof at the four corners of the warning signal, preventing the lateral rocking motions at high speeds. The pivotal mounting of the pads and clips allows the warning signal to be quickly installed on a variety of roof sizes. The pads can be located close to the edge on the sloping portion of the roof where resistance to bending is higher than toward the center.

While the invention has been shown in only one of its forms, it should be apparent to those skilled in the art that is is not so limited but is susceptible to various changes and modifications without departing from the spirit thereof.

We claim:

1. In a warning signal apparatus for mounting on the roof of a vehicle of the type having a frame including a metal rim, and signal light means mounted on opposite sides of the frame, an improved means for mounting the warning signal apparatus to the vehicle, comprising:

a pair of spaced apart brackets attached to the rim on each side of the warning signal apparatus, each bracket having an outer end portion extending below the rim and outward with an aperture therethrough;

a rod extending between the outer ends of the bracket on either side, the rod having threaded holes in its ends adapted to align with the apertures in the bracket outer ends;

a resilient pad with an upstanding metal flange having an aperture therethrough that is adapted to align with the aperture in the outer end of each bracket, the rod, brackets, and flanges being coupled together by a screw threaded into the ends of each rod, whereby loosening the screw allows the pad to be pivoted for selectively seating the pad on a sloping portion of the vehicle roof;

a clip having catch means for engaging the edge of the roof of the vehicle; and adjusting means linking the clip with the bracket for varying the distance between the bracket and the clip to tighten the frame to the roof.

2. In a warning signal apparatus for mounting on the roof of a vehicle of the type having a frame including a metal rim, and signal light means mounted on opposite sides of the frame, an improved means for mounting the warning signal apparatus to the vehicle, comprising:

a pair of spaced apart brackets attached to the rim of each side of the warning signal apparatus, each bracket having an outer end portion extending below the rim and outward with an aperture therethrough;

a straight rod extending between the outer ends of the brackets on each side, the rod having threaded holes in its ends adapted to align with the apertures in the bracket outer ends;

a resilient pad with a flat upstanding metal plate having an aperture therethrough that is adapted to align with the aperture in the outer end of each bracket, the rod, brackets, and plates being coupled together by a screw threaded into the ends of each rod, whereby loosening the screw allows the pad to be pivoted for selectively seating the pad on a sloping portion of the vehicle roof; and a pair of spaced apart clips, each having an upper portion with an aperture therethrough, and a lower portion that extends inwardly for engagement with the edge of the roof, each clip being fastened to the rod by a screw that extends through the aperture in the upper portion and engages a threaded hole extending transversely through the rod.

3. The apparatus according to claim 2 wherein the rim has a lower edge with a plurality of apertures extending therethrough, and wherein the bracket comprises a flat plate having an upper end portion bent at a right angle with respect to the outer end portion, the upper end portion having an aperture therethrough aligning selectively with one of the apertures in the rim, the bracket being connected to the rim by a bolt inserted through the aligned apertures, thereby allowing the bracket to be positioned at selected distances from the edge of the frame.

* * * * *